US012753809B2

(12) United States Patent
Bosis et al.

(10) Patent No.: US 12,753,809 B2
(45) Date of Patent: Oct. 6, 2026

(54) PROTECTIVE CAP FOR FLOATING BRAKE CALIPER GUIDES

(71) Applicant: Brembo S.p.A, Curno (IT)

(72) Inventors: Alberto Bosis, Curno (IT); David Corna, Curno (IT)

(73) Assignee: Brembo, S.p.A., Curno (IT)

( * ) Notice: Subject to any disclaimer, the term of this patent is extended or adjusted under 35 U.S.C. 154(b) by 492 days.

(21) Appl. No.: 18/252,550

(22) PCT Filed: Nov. 9, 2021

(86) PCT No.: PCT/IB2021/060353
§ 371 (c)(1),
(2) Date: May 11, 2023

(87) PCT Pub. No.: WO2022/101774
PCT Pub. Date: May 19, 2022

(65) Prior Publication Data

US 2024/0019006 A1 Jan. 18, 2024

(30) Foreign Application Priority Data

Nov. 13, 2020 (IT) ........................ 102020000027200

(51) Int. Cl.
*F16D 55/226* (2006.01)
*F16D 55/00* (2006.01)
*F16D 55/2265* (2006.01)

(52) U.S. Cl.
CPC ..... *F16D 55/226* (2013.01); *F16D 55/22655* (2013.01); *F16D 2055/002* (2013.01); *F16D 2055/0037* (2013.01); *F16D 2055/0041* (2013.01); *F16D 2055/007* (2013.01)

(58) Field of Classification Search
CPC ........... F16D 55/226; F16D 2055/0037; F16D 55/22655; F16D 65/068; F16D 2055/0016; F16D 2055/002; F16D 2055/007; F16D 2055/0041
See application file for complete search history.

(56) References Cited

U.S. PATENT DOCUMENTS 4,768,626 A 9/1988 Le Deit et al.
6,272,914 B1 8/2001 Ciotti
9,587,686 B2 * 3/2017 Morais .................. F16D 55/227
(Continued)

FOREIGN PATENT DOCUMENTS

DE 3635828 A1 5/1988
DE 102015217415 A1 3/2017
(Continued)

OTHER PUBLICATIONS

French Patent No. FR 2567227 to Weiler et al published on Jan. 10, 1986.*
(Continued)

*Primary Examiner* — Pamela Rodriguez
(74) *Attorney, Agent, or Firm* — Marshall & Melhorn, LLC

(57) ABSTRACT

A protective cap for floating brake caliper guides may have a cup-like body intended to be associated with a floating brake caliper closing a sliding seat of a guide of the floating caliper. The cup-like body is made of plastic material reinforced with glass fibers.

20 Claims, 14 Drawing Sheets

(56) References Cited

U.S. PATENT DOCUMENTS

| | | | | |
|---|---|---|---|---|
| 2017/0261051 A1* | 9/2017 | Becker | ................ | F16D 55/2265 |

FOREIGN PATENT DOCUMENTS

| | | | |
|---|---|---|---|
| EP | 1332976 | A1 | 8/2003 |
| WO | 2009050751 | A1 | 4/2009 |

OTHER PUBLICATIONS

WO document No. WO 2019/244101 to Bosis et al published on Dec. 26, 2019.*

British Patent No. GB 2595663 to Roberts et al published on Dec. 8, 2021.*

European Patent Office, International Search Report and Written Opinion in Application No. PCT/IB2021/060353, dated Feb. 8, 2022, 10 pages, Rijswijk, Netherlands.

Italian Patent and Trademark Office, Search Report in Application No. IT202000027200, dated Jul. 7, 2021, 2 pages.

Chinese National Intellectual Property Administration, Chinese Non-Final Office Action Dated Nov. 25, 2025—Text of the First Office Action (PCT application entering the national phase), Application No. 2022800396459 Ref. No. PPI23170890IT Beijing, China.

* cited by examiner

| Table 1 | Energy [J] | Velocity [m/s] | Time [s] | Height [mm] | Notes |
|---|---|---|---|---|---|
| Traditional caps | 0,54 | 0,64 | 0,07 | 21 | Local deformation on outside diameter |
| | 0,82 | 0,79 | 0,08 | 32 | Local damage on outside diameter |
| | 1,15 | 0,94 | 0,10 | 45 | Local damage on outside diameter |
| | 1,66 | 1,13 | 0,12 | 65 | Damage to internal and external parts |
| | 2,43 | 1,37 | 0,14 | 95 | Damage to internal and external parts |
| | 2,94 | 1,50 | 0,15 | 115 | Damage to internal and external parts |

FIG.22

| Table 2 | Energy [J] | Velocity [m/s] | Time [s] | Height [mm] | Notes |
|---|---|---|---|---|---|
| Cap according to the invention | 0,61 | 0,69 | 0,07 | 24 | Local deformation on outside diameter |
| | 0,90 | 0,83 | 0,08 | 35 | Local deformation on outside diameter |
| | 1,23 | 0,97 | 0,10 | 48 | Local deformation on outside diameter + small fracture in the critical area of the cap |
| | 1,48 | 1,07 | 0,11 | 58 | Cap damaged + part disassembled from the seat |
| | 1,74 | 1,16 | 0,12 | 68 | Cap damaged + part disassembled from the seat |

FIG.23

PROTECTIVE CAP FOR FLOATING BRAKE CALIPER GUIDES

CROSS-REFERENCE TO RELATED APPLICATIONS

This application is a National Phase Application of PCT International Application No. PCT/IB2021/060353, having an International Filing Date of Nov. 9, 2021, which claims priority to Italian Application No. 102020000027200 filed Nov. 13, 2020, each of which is hereby incorporated by reference in its entirety.

FIELD

The subject matter of the present invention is a protective cap for floating brake caliper guides.

The cap according to the invention may be installed on any type of floating brake caliper, but is particularly suitable for application on floating brake calipers for light commercial vehicles, motor vehicles, SUVs, and vehicles intended for off-road use such as 4×4 vehicles, pickups, and military vehicles.

BACKGROUND

In general, a disc brake system with a floating caliper comprises a support structure that straddles the braking disc and is adapted to be installed on a fixed portion of the vehicle, and at least a floating structure (caliper) slidably mounted by means of special guides on the support structure. The sliding movement (floating) of the caliper (when installed) is parallel to the axis of rotation of the disc (hereinafter the axial direction).

Generally, the floating structure (hereinafter the caliper, for the sake of simplicity) comprises a side portion arranged outside the support structure (generally on the hub side of the braking system) and a bracket portion which extends from the side portion in the axial direction (toward the wheel side) on the support structure.

The caliper carries two brake pads slidably associated by means of at least one pin, arranged inside a specially provided housing made in the support structure so that they can come into contact with the braking surfaces of the disc. A first pad, called the active pad, is pushed against the disc directly by pushing means housed in the side portion of the floating caliper. The second pad, or reaction pad, opposing the first pad, is pushed against the disc by the bracket portion of the floating caliper as the caliper slides as a result of the reaction caused by the interaction between the first pad and the disc.

As a very general rule, a floating caliper guide comprises a bushing that is inserted into a sliding seat made in the floating caliper or in the support structure of the disc brake, and a pin, which is in turn slidably inserted into the bushing with the exception of a coupling end portion (threaded) that is secured to the support structure or to the caliper (depending on which of these two parts carries the bushing).

In order to prevent foreign objects (dust, water, etc.) from entering the guide and to therefore ensure proper operation of the brake, the guide is closed on the outside by a cap that serves as a plug. Normally, the closing cap is placed directly on the caliper or the support body at the portion delimiting the sliding seat of the guide.

Generally, caps for floating brake caliper guides are made of an elastomeric material, such as rubber. The use of such a material allows for manual installation and removal of the cap, while still providing a good seal against water.

An example of a rubber cap is shown in FIGS. 1 to 4. The cap T is defined by a cup-like body G provided—at the free end thereof—with an annular prominence R projecting inward. As shown in FIG. 1, the cap is fitted onto the portion of the caliper C which delimits the guide seat until the annular prominence R snaps into a specially provided groove made in the caliper. Once installed, the cap, internally hollow, does not hinder the movements of the guide pin. On the outside, the cap T is provided with a protruding appendage Q which may be used as a gripping part during the removal thereof.

Rubber caps, however, suffer from a series of limitations.

A first limitation has to do with the fact that rubber caps are easy to damage under some usage conditions, for example impacts from rocks while the vehicle is traveling over dirt roads. If struck by crushed stone or gravel, rubber caps tend to break or at least be perforated. Once perforated, the caps are no longer waterproof. This inevitably leads to corrosion of the guides.

A second limitation has to do with the fact that rubber caps sometimes come off accidentally due to deformations in the rubber caused by thermal stress or pressure surges. Deformations caused to rubber caps over time have a negative impact on their ability to be waterproof, even if they do not result in accidental removal.

A third limitation is linked to the excessive ease of removal of rubber caps. Indeed, it has been observed that it is not unusual for rubber caps to be removed unintentionally during brake maintenance due to their excessive ease of removal, and, being small, they are forgotten with the result that the guides are exposed to contact with water.

There is consequently a need in the field of floating caliper brakes to have guide caps that are stronger, are not subject to accidental removal, and provide a higher degree of waterproofness. Caps must in addition continue to be easily removable without the use of tools.

SUMMARY

Therefore, the main purpose of the present invention is to eliminate, or at least reduce, the aforementioned problems relating to the prior art by providing a protective cap for floating brake caliper guides that is more resistant to impact.

Another purpose of the present invention is to provide a protective cap for floating brake caliper guides that is not subject to, or is at least less subject to, accidental removal.

Another purpose of the present invention is to provide a protective cap for floating brake caliper guides that is more watertight.

Another purpose of the present invention is to provide a protective cap for floating brake caliper guides that is easy to install without the use of tools.

DESCRIPTION OF THE FIGURES

The technical features of the invention are clearly identified in the content of the claims set out below and its advantages will become more readily apparent in the detailed description that follows, made with reference to the accompanying drawings, which represent one or more embodiments provided purely by way of non-limiting examples, in which:

FIGS. 22 and 23 show tables 1 and 2, respectively, of impact tests conducted on a traditional rubber cap shown in FIGS. 1-4 and on a cap according to the invention, respectively.

Elements or parts of elements common to the embodiments described hereinafter will be indicated with the same numerical references.

DETAILED DESCRIPTION

With reference to the accompanying drawings, the number 1 refers to a protective cap for floating brake caliper guides according to the invention, as a whole.

According to a general embodiment of the invention, the protective cap 1 for floating brake caliper guides comprises a cup-like body 10 intended to be associated with a floating brake caliper closing a sliding seat of a guide of said floating caliper.

Figure 6:
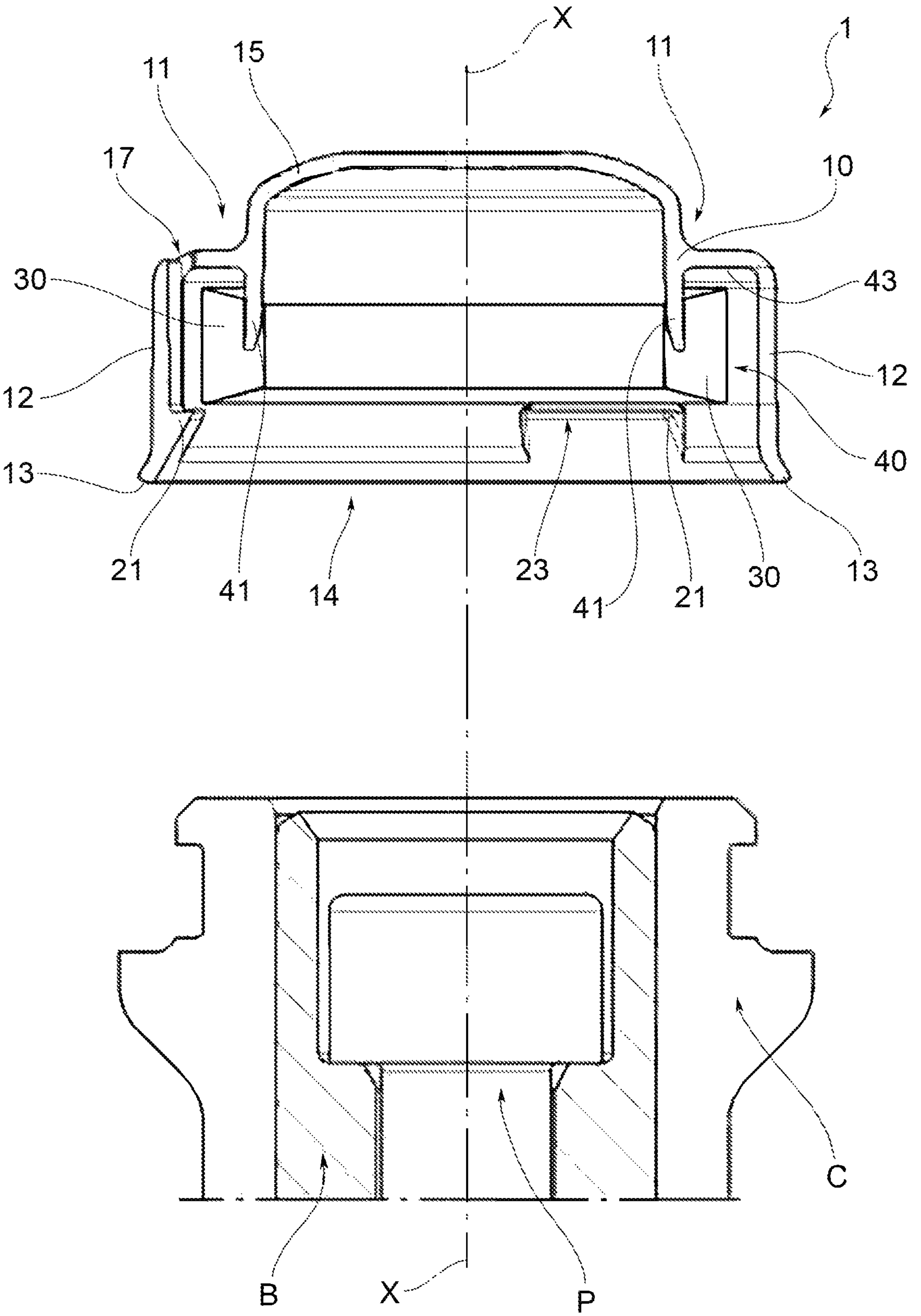
FIG. 6 shows an exploded view according to a cross-sectional orthogonal view of the cap in FIG. 5.
Figure 7:
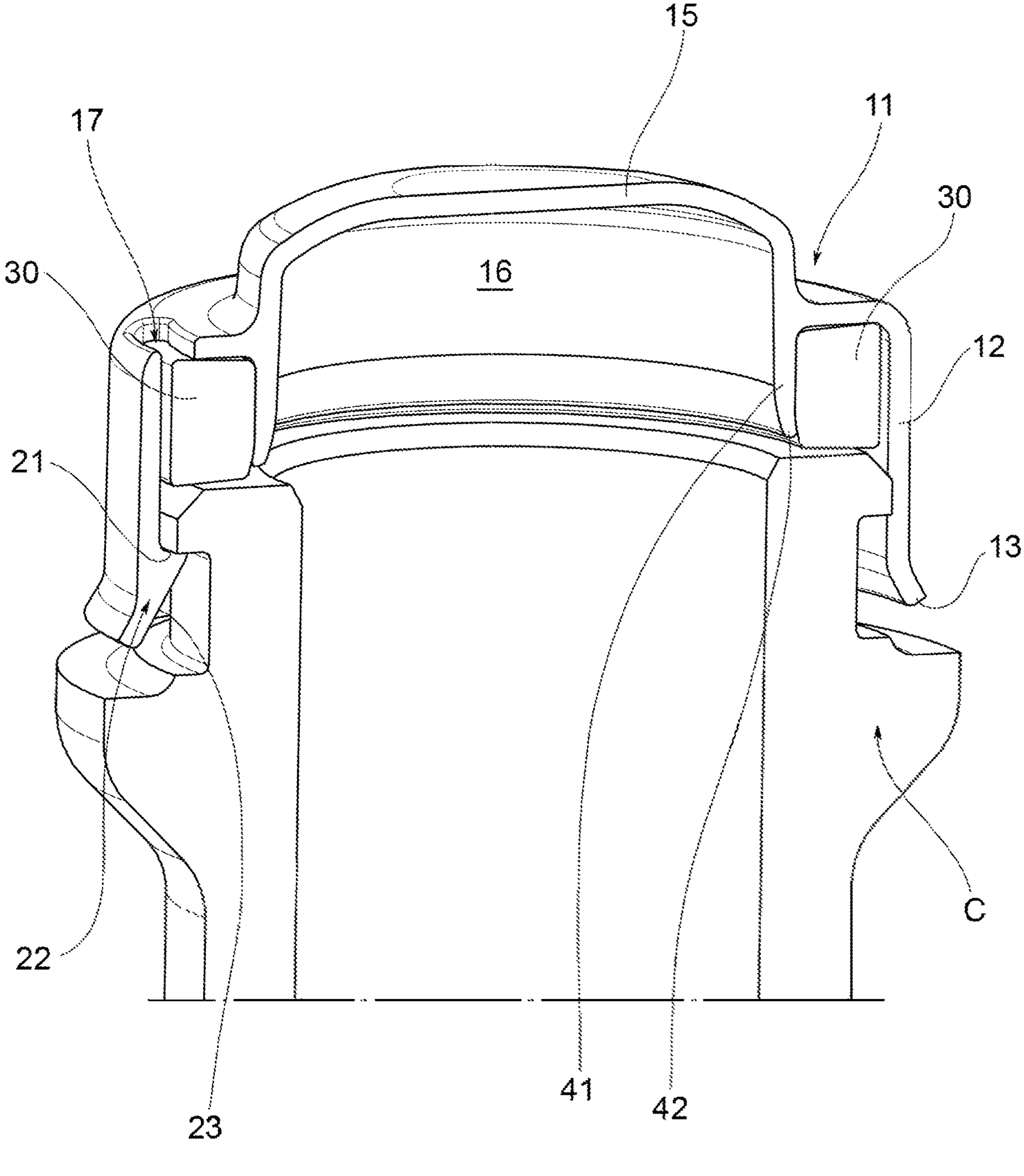
FIG. 7 shows a cross-sectional orthogonal view of the cap in FIG. 5 illustrated as installed on a brake caliper.
Figure 8:
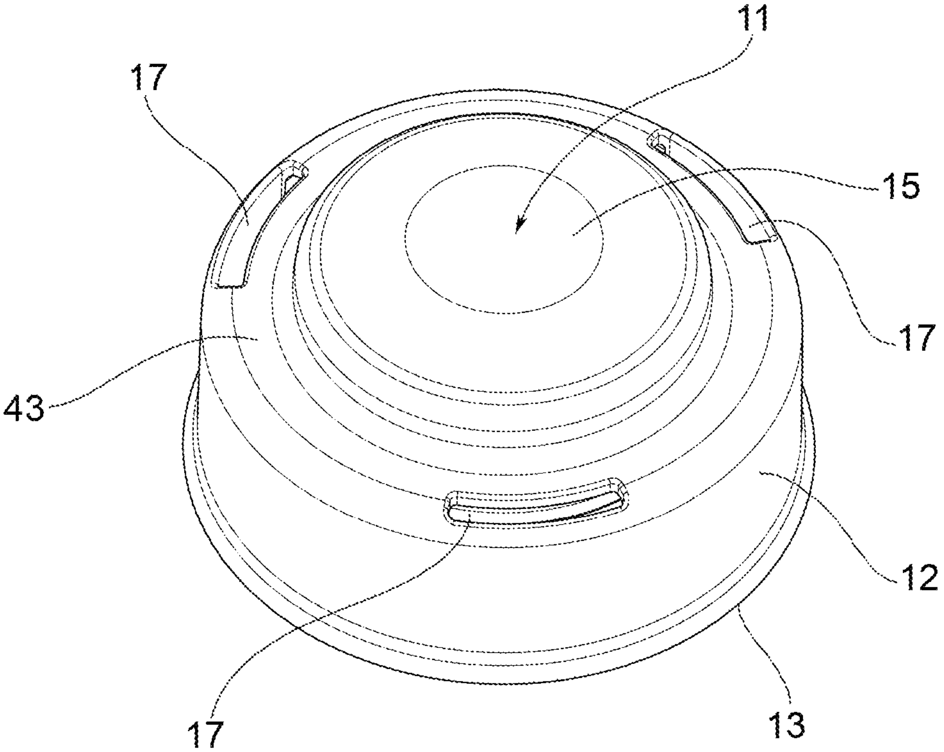
FIGS. 8 and 9 show two perspective views of the outside and inside of the cap in FIG. 5, respectively.

In particular, as shown in FIGS. 6 and 7, the cup-like body 10 is intended to house therein a portion of a floating brake caliper that delimits a sliding seat of a guide. In these FIGS. 6 and 7 the floating caliper portion is indicated with the letter C, the guide bushing with letter B, and the guide pin with letter P.

The aforementioned cup-like body 10 is made of plastic material reinforced with glass fibers.

Compared to traditional protective caps made of rubber, the protective cap 1 is much more resistant to impact, thanks to the fact that it is made of plastic material reinforced with glass fibers. Thanks to this feature, the cap 1 provides greater protection over time against external agents, such as pebbles, gravel, and water compared to traditional rubber caps.

The cap 1 has high strength, but if excessively stressed it breaks rather than deforming. Indeed, once again thanks to the fact that it is made of a plastic material reinforced with glass fibers, the cap 1 has a fragile breaking characteristic rather than a ductile one like traditional rubber caps.

Thanks to the greater rigidity of the cap 1, and therefore conversely its lesser deformability, the cap 1 ensures a more secure attachment to the brake caliper.

The attachment of the cap 1 to the brake caliper—unlike traditional rubber caps—is substantially irreversible. Indeed, operatively, in order for the cap 1 to be removed, it must necessarily be destroyed by means of a tool. This is advantageous when performing maintenance on disc brakes with floating calipers, since the operator is made more aware during the operation of removal and, at the same time, the risk that worn-out caps will be reinstalled erroneously is reduced.

Preferably, the aforementioned plastic material is chosen from the group consisting of Polyamide, Polycarbonate (PC), Polypropylene (PP), Acrylonitrile Butadiene Styrene (ABS), High Density Polyethylene (HDPE), Ethylene Vinyl Acetate (EVA), Polyethylene Terephthalate (PET), Polyurethane (PU), Polyoxymethylene (POM), and Polystyrol (PS). Even more preferably, the aforementioned plastic material consists of polyamide.

Preferably, the glass fiber content is from 25% to 35% by weight of the cup-like body 10. Even more preferably, the glass fiber content is from 28.5% to 31.5% by weight of the cup-like body, and most preferably it is equal to 30% by weight.

With a glass fiber content by weight falling within the aforementioned ranges, it is possible to impart not only adequate mechanical strength to the cup-like body 10, but also minimal elastic behavior which, combined with design features described below, allows for installation of the cap 1 on a brake caliper without the help of tools.

With glass fiber contents greater than the aforementioned ranges, the cup-like body 10 becomes too fragile for a minimal increase in mechanical strength. It has also been found that an increase in the glass fiber content makes the injection molding of the cup-like body difficult, to the point of being outright impossible for values equal to or greater than 60% by weight.

Advantageously, as will be reiterated below, the cup-like body 10 may therefore be made by injection molding.

According to an embodiment described in the appended figures, the cup-like body 10 of the cap 1 comprises a bottom wall 11 and a side wall 12.

The side wall 12 extends axially from the bottom wall and delimits perimeterally with a free edge 13 thereof a mouth 14 of the cup-like body in a position axially opposed to the bottom wall 11.

Preferably, as shown in particular in FIGS. 8 to 12, the aforementioned side wall defines a tubular body having a substantially circular cross section on a cross section plane transverse to said axial direction. The diameter of the circular cross section may vary along said axial direction.

Advantageously, the cup-like body 10 comprises means 20 for snap fastening the cup-like body onto a floating brake caliper.

Figure 9:
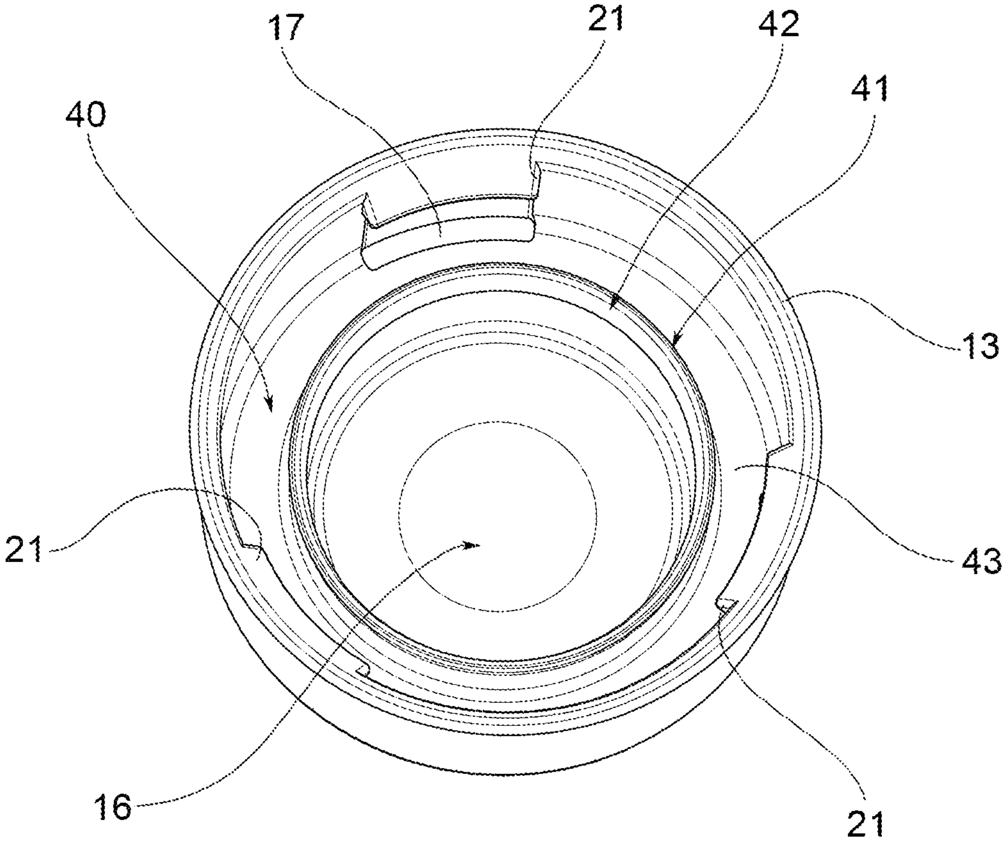
Figure 10:
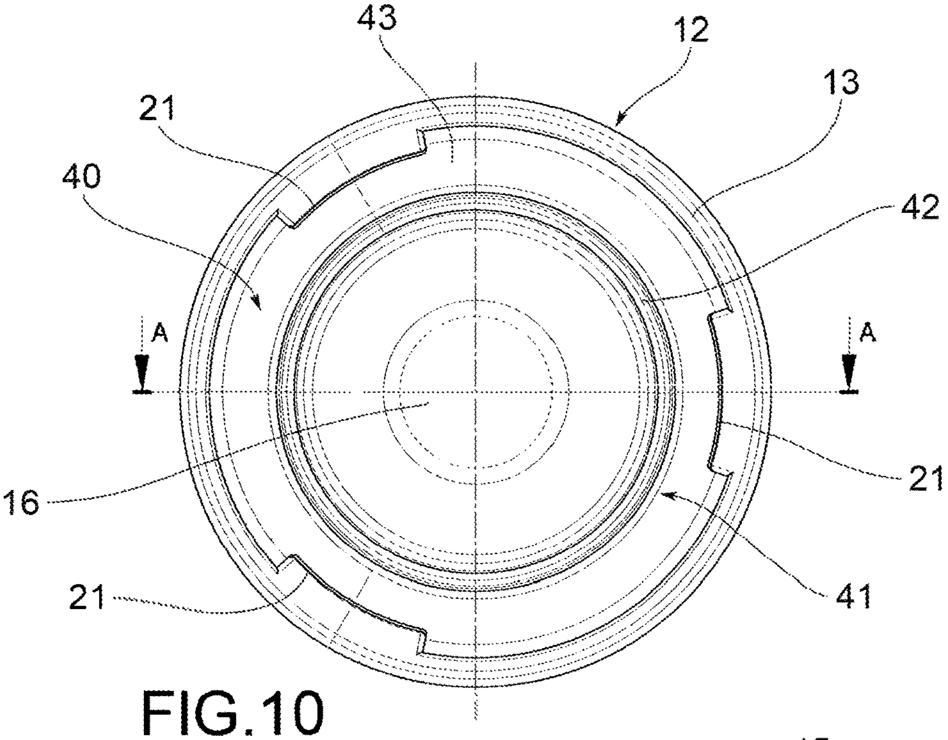
FIG. 10 shows an orthogonal plan view of the cap in FIG. 9.
Figure 11:
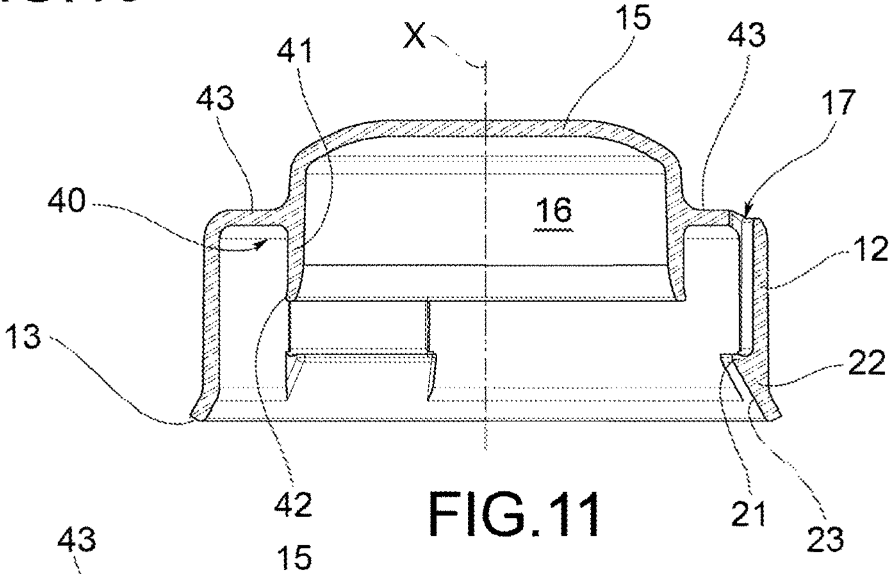
FIG. 11 shows a cross-sectional orthogonal view of the cap in FIG. 10 along the plane of cross-section A-A indicated therein.
Figure 12:
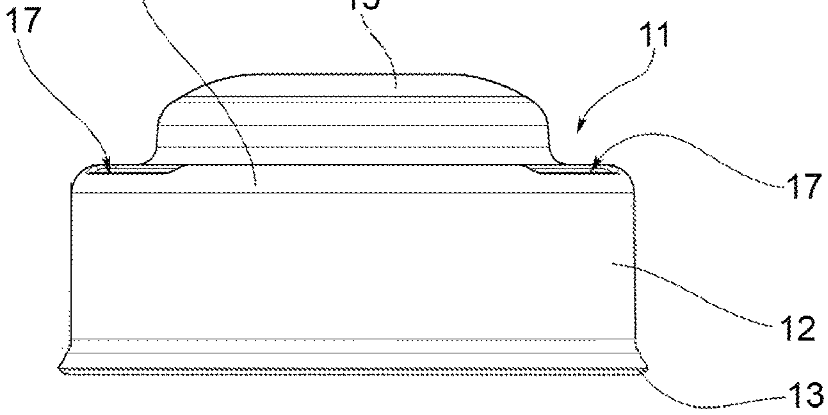
FIG. 12 shows an orthogonal elevation view of the cap in FIG. 8.

Preferably, as shown in particular in FIGS. 9, 10, and 11, the aforementioned snap fastening means 20 consist of a plurality of teeth 21 made on an inside surface of the aforementioned side wall 12 of the cup-like body and project toward the inside of the cup-like body, forming undercuts.

Furthermore, in the preferred case in which the side wall 12 defines a tubular body with a circular cross section, each of said aforementioned teeth 21 is defined by a ledge that develops along an arc of circumference of the side wall 12.

Preferably, the teeth 21 are all positioned at the same height in the axial direction with respect to the bottom wall 11 of the cup-like body 10.

According to an embodiment shown in the appended figures, the teeth 21 are preferably distributed along the perimeter extension of the side wall 12 so as to be spaced evenly apart. In this way, especially in combination with all the teeth being positioned at the same height, a more homogeneous mechanical fastening of the cup-like body is achieved, with advantages in terms of better stress distribution when the cap is installed and ease of cap installation on the caliper.

Operatively, the fact that the snap fastening means consist of a plurality of separate teeth and not a single continuous tooth with a circular crown gives the cup-like body better elasticity, which facilitates manual installation of the cup-like body on the caliper.

According to a preferred embodiment shown in the appended figures, there are three teeth 21, each preferably with an angle of between 35° and 40°. It has been found that with only two teeth, adequate fastening stability is not ensured, whereas with four or five teeth, installation is more difficult with the risk that some teeth will not grab hold.

Figure 13:
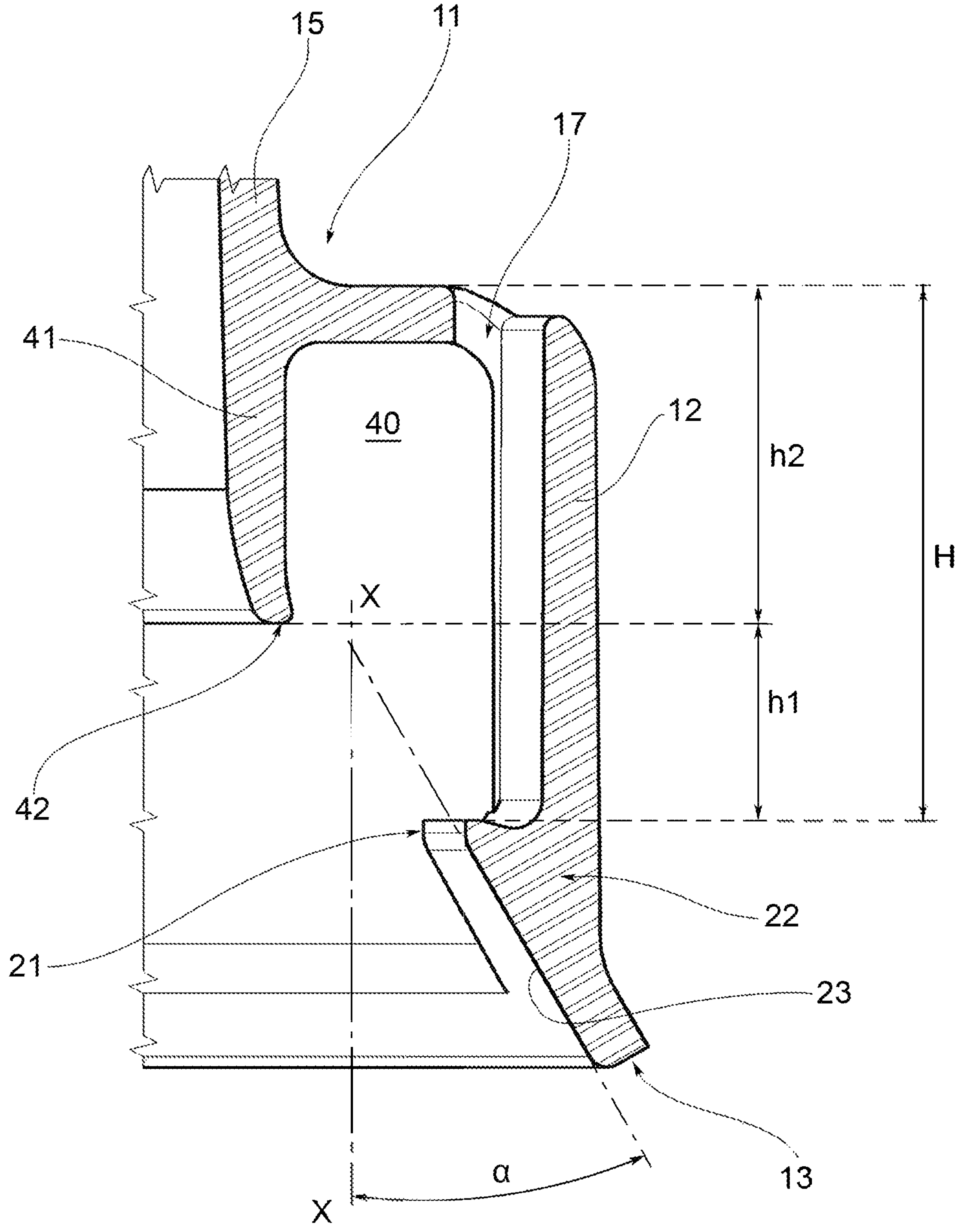
FIG. 13 shows an enlarged detail of FIG. 11.
Figure 14:
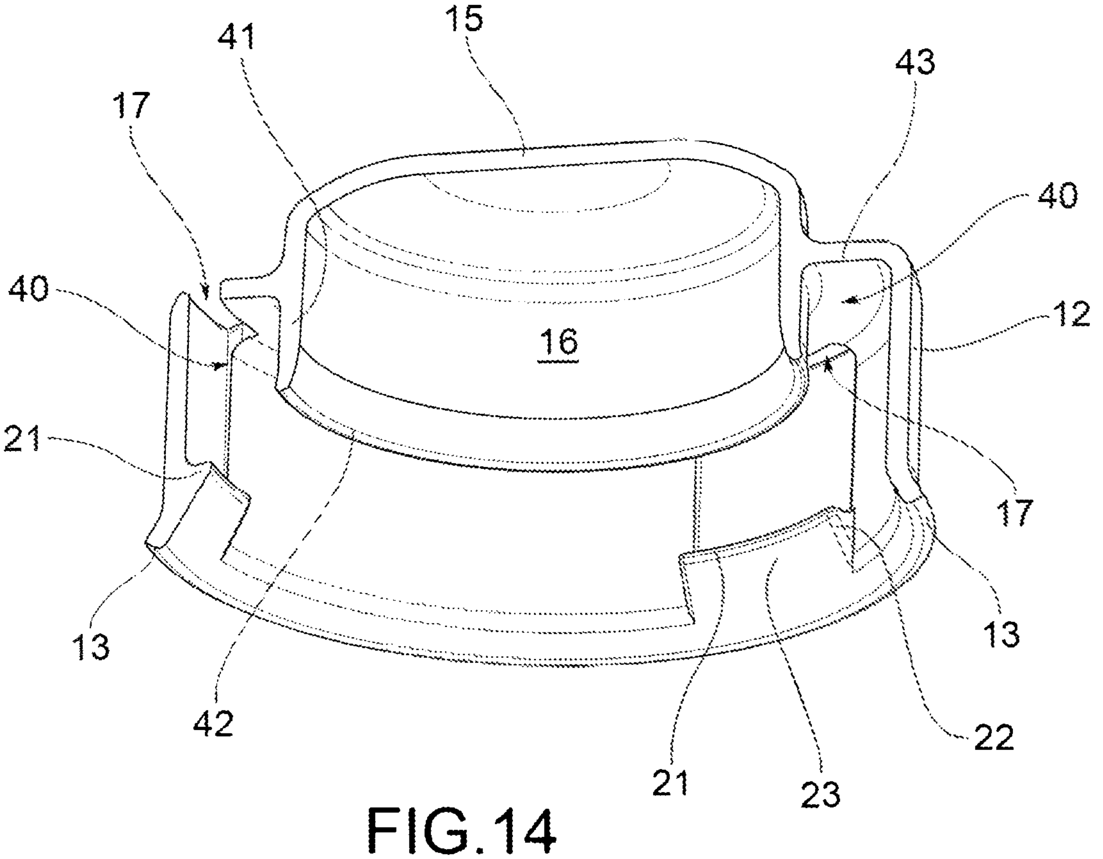
FIG. 14 shows a cross-sectional perspective view of the cap in FIG. 8.

Preferably, as shown in particular in FIGS. 7, 11, and 13, each tooth 21 is connected to the free edge 13 of the aforementioned side wall 12 by means of a chamfer portion 22 having an inclined chamfer surface 23 which faces toward the inside of the cup-like body and converges toward the aforementioned bottom wall 11.

Preferably, as shown in particular in FIG. 13, the aforementioned inclined chamfer surface 23 forms an angle of between 28° and 32° with respect to the axial direction X. Advantageously, during the sizing phase, the value of the angle $\alpha$ may be varied to adjust the thrusting load of the cup-like body 10 on a caliper, where the "thrusting load" is understood as the force needed during installation to activate the snap fastening means 20.

Advantageously, the side wall 12 is flared toward the outside along the entire free edge 13 thereof, connecting to the chamfer portions 22 of the teeth 21 without any break in continuity. In this way, the entire free edge 13 delimiting the mouth 14 of the cup-like body 10 acts as a chamfer for coupling the cap 1 to the caliper, thus facilitating the manual installation thereof.

Figure 1:
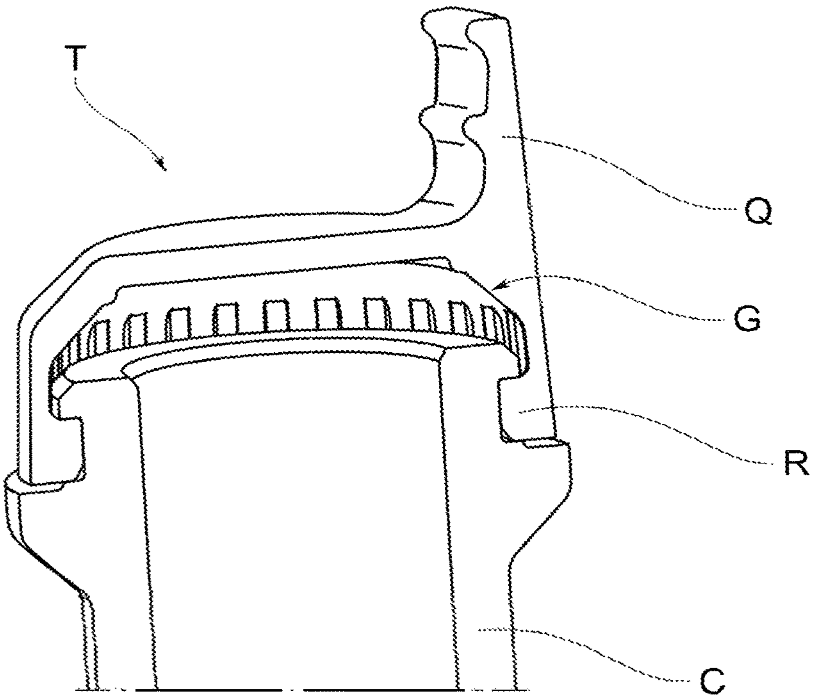
Prior Art FIG.1
FIGS. 1 and 2 show a cross-sectional perspective view and a cross-sectional orthogonal view, respectively, of a traditional protective cap for floating brake caliper guides shown in the assembled state on a brake caliper.
Figure 2:
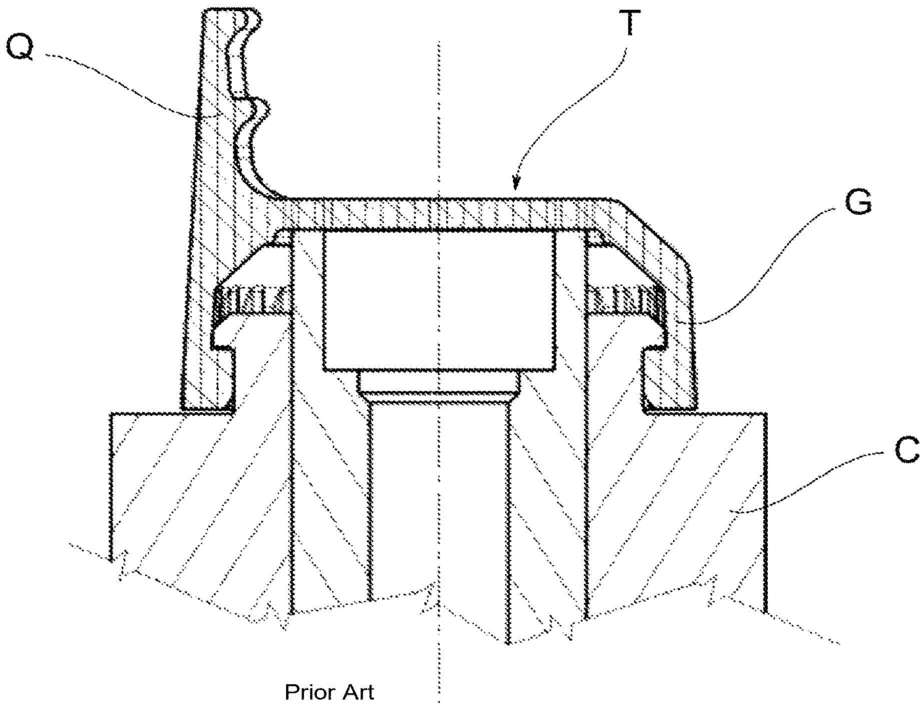
Prior Art FIG.2
Figure 3:
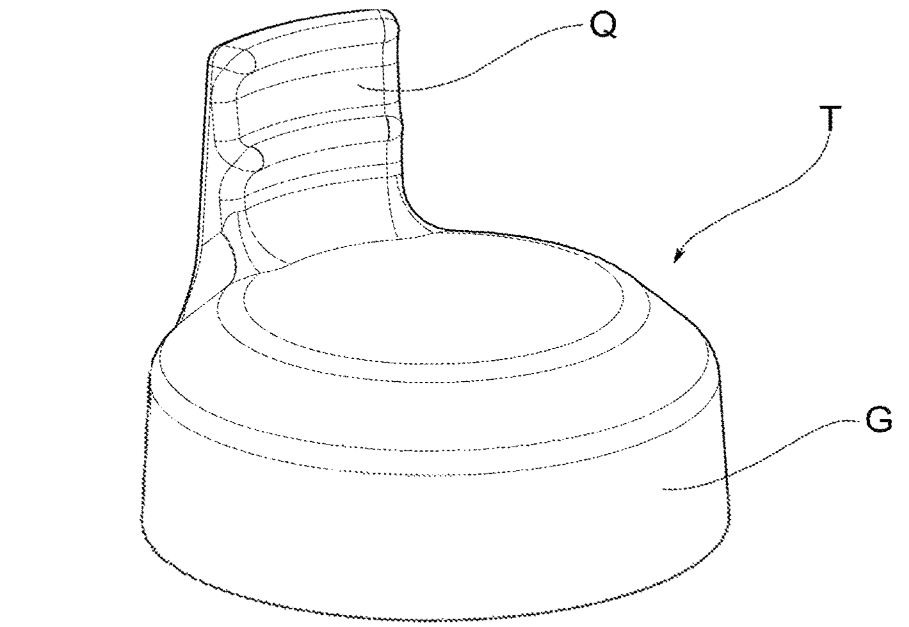
Prior Art FIG.3
FIGS. 3 and 4 show two perspective views of the inside and outside of the cap in FIG. 1, respectively.
Figure 4:
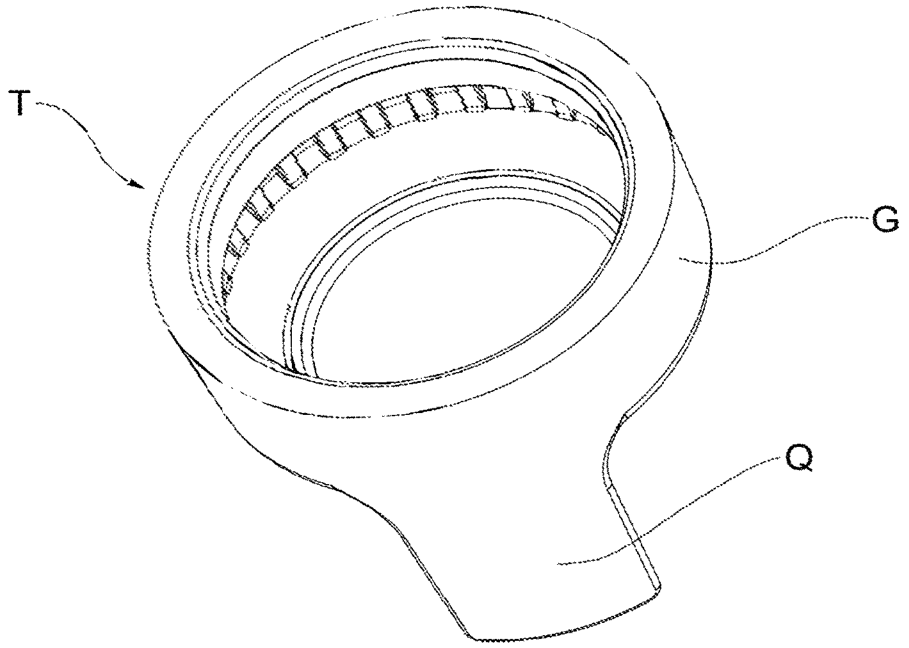
Prior Art FIG.4
Figure 5:
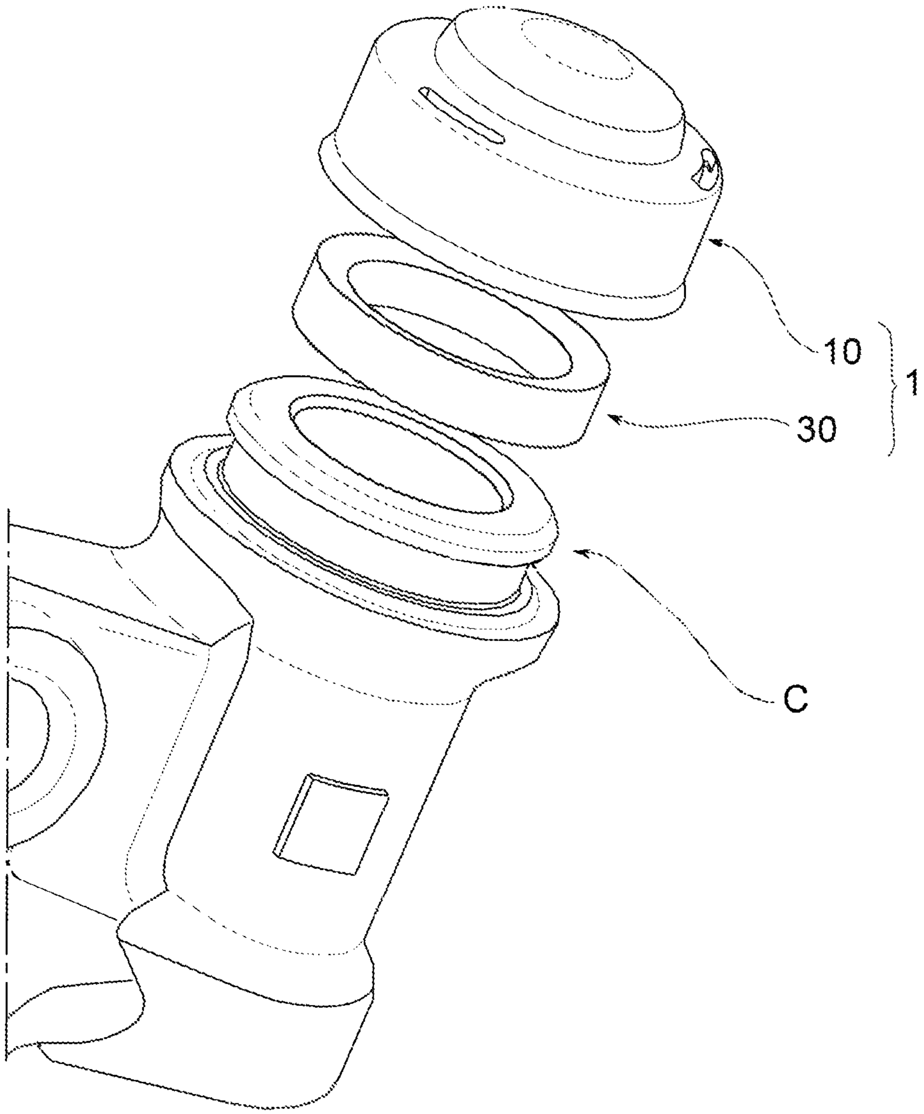
FIG. 5 shows an exploded perspective view of a protective cap for floating brake caliper guides according to a preferred embodiment of the invention.

Advantageously, as shown in particular in FIGS. 5, 6, and 7, the cap 1 comprises a gasket 30 made of elastomeric material, housed in the cup-like body 10 at the bottom wall 11. During use, the aforementioned gasket is intended to be compressed between the cup-like body and the floating caliper so as to seal a sliding seat of a guide.

Preferably, the aforementioned gasket 30 consists of an O-ring, preferably with a circular shape.

Advantageously, the aforementioned cup-like body 10 comprises an annular seat 40, preferably with a circular shape, to house said O-ring 30. This annular seat 40 is made in the bottom wall 11 and is coaxial with the side wall 12 of the cup-like body 10.

According to a preferred embodiment shown in the appended figures, the aforementioned annular seat 40 consists of a cavity radially delimited between the side wall 12 and a tubular appendage 41, which extends coaxially from the bottom wall 11 to the side wall 12. The bottom wall 11 defines the bottom 43 of said cavity 40.

In particular, as shown in particular in FIGS. 9 and 10, the tubular appendage 41 has a circular cross section.

Advantageously, as shown in particular in FIG. 13, the tubular appendage 41 extends axially in height from the bottom wall 11 up to a height h2 less than height h1 at which the teeth 21 are located. In this way, there is a predefined distance H in the axial direction between the teeth 21 and the free edge 42 of said tubular appendage 41.

Preferably, as shown in particular in FIG. 13, the teeth 21 have a smaller radial extension than the radial extent of the annular seat 40. In other words, the teeth 21 do not extend radially beyond the tubular appendage 41.

Preferably, the aforementioned annular seat 41 has an inside diameter greater than the inside diameter of said O-ring 30. In this way, the O-ring 30, when housed in the seat 40, is radially deformed.

Preferably, the aforementioned O-ring 30 is sized in such a way that, once housed in the annular seat 40 and therefore radially deformed, the O-ring 30 extends axially beyond the free edge 42 of the aforementioned tubular appendage 41 until it substantially reaches the teeth 21. In this way, during use, when the cup-like body is associated with a caliper body, the O-ring 30 may be axially compressed between the cup-like body 10 and the caliper, thus increasing the sealing capacity and allowing the cap 1 to seal the sliding seat of the guide. Thanks to this axial compression, the O-ring 30 is pushed to occupy the entire annular seat 40, as shown in FIG. 7, so as to create a barrier to the possible infiltration of water or tiny objects between the side wall 12 of the cup-like body and the caliper.

Figure 15:
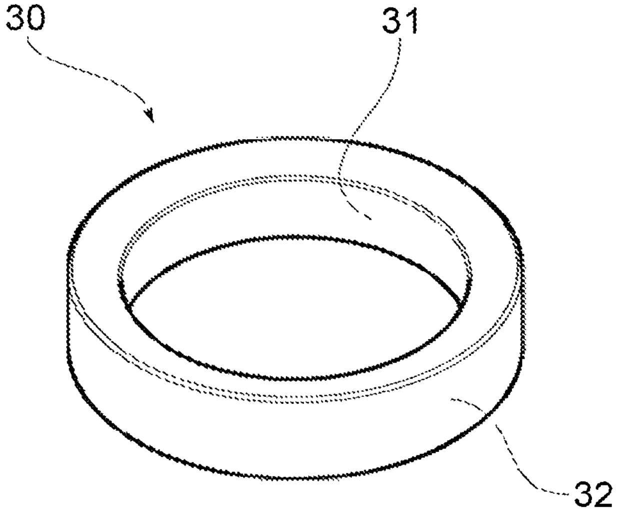
FIG. 15 shows a perspective view of an O-ring gasket.
Figure 16:
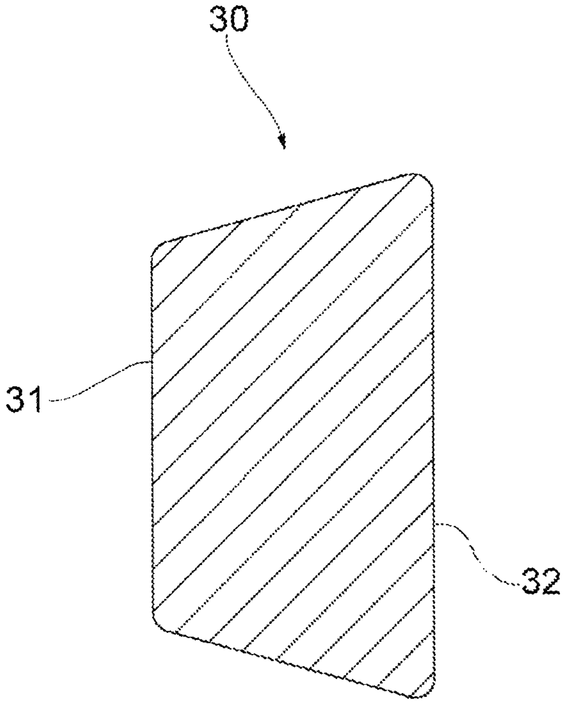
FIG. 16 shows a radial cross-section of the gasket in FIG. 15.

Advantageously, as shown in particular in FIGS. 6, 15, and 16, the O-ring 30 has a trapezoidal-shaped radial cross section when it is not deformed. Preferably, the smaller base 31 of this trapezoidal cross section is on the inside of the O-ring and the larger base 32 of this trapezoidal cross section is on the outside of the O-ring.

Operatively, the trapezoidal shape serves to provide a good compromise between ease of installation (the operation which axially compresses the O-ring) and effective sealing. The greater the axial height of the O-ring, the greater the compression/deformation action and therefore the potential sealing. However, with increasing axial height of the O-ring also comes increased O-ring rigidity, and consequently increased compressive force required for installation. The trapezoidal shaped cross section allows the O-ring to be compressed (so that it is deformed and forms a seal) while still limiting the effort required for installation.

The O-ring may also have a rectangular cross section. However, tests have shown that this shape does not achieve the same results as the trapezoidal shape, since, the sealing seal being equal, installation of the cap requires the use of greater force.

Operatively, in the preferred embodiment in which the cap 1 comprises an O-ring gasket, the cup-like body essentially serves two functions:

- maintaining the O-ring (gasket) in pressure against the caliper body; and
- protecting the guide of a floating caliper against the action of external agents (gravel, pebbles, water).

Operatively, the elastic reaction exerted by the gasket on the cup-like body tends to stabilize the hold of the cup-like body on the caliper, thus further reducing the risk of accidental removal of the cap from the caliper.

According to a preferred embodiment shown in the appended figures, the bottom wall 11 of the cup-like body 10 may comprise a shell 15 that is coaxial with the side wall 12 and defines a chamber 16 that extends axially beyond the bottom 43 of the annular seat 40. Preferably, the shell 15 has a cross section that is not greater than the cross section of the aforementioned tubular appendage 41, of which it is substantially the axial continuation.

Operatively, the chamber 16 delimited by the shell 15 axially protruding from the bottom 13 of the annular seat 40 affords additional free space for any movements of the guide pin. In this way, the risk of the cap interfering with the movements of the guide is further reduced.

As mentioned earlier, the aforementioned cup-like body 10 may advantageously be made by injection molding. In particular, injection molding of the cup-like body 10 is possible with multi-cavity molds.

Figure 17:
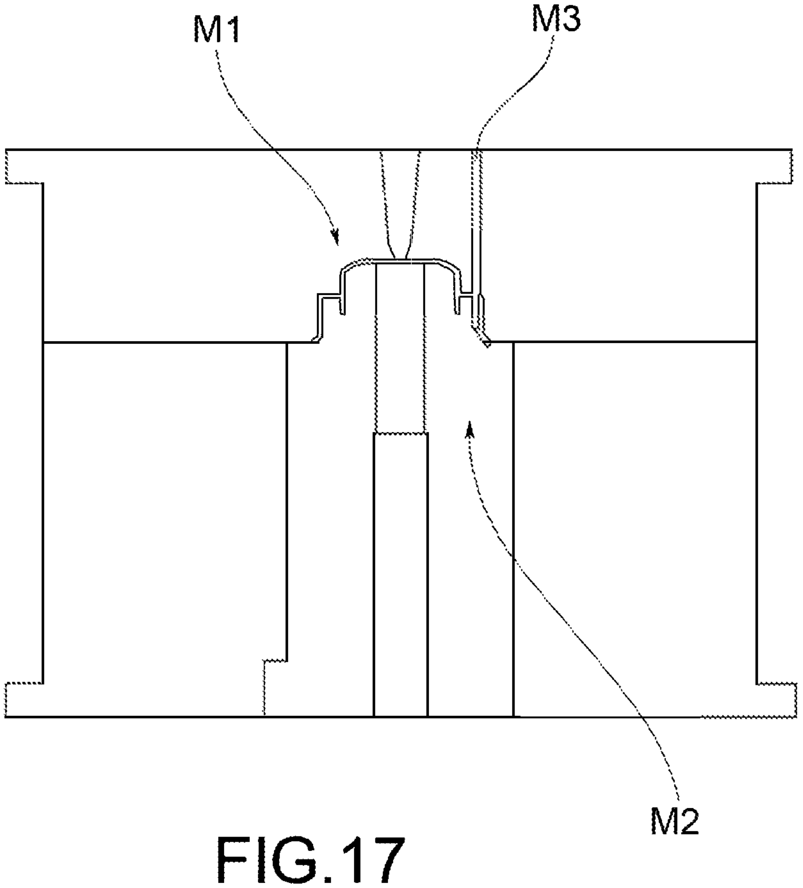
FIG. 17 shows a cross-sectional view of an injection mold for producing the cap in FIG. 8.
Figure 18:
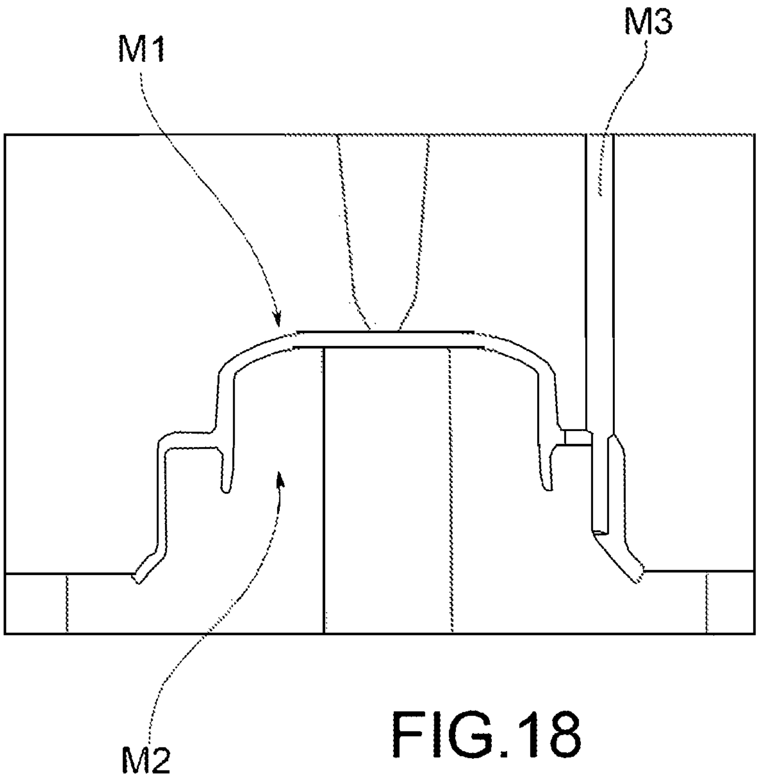
FIG. 18 shows an enlarged view of a detail of the mold in FIG. 17.

In particular, as shown in FIGS. 17 and 18, each tooth 21 (which is an undercut) may be made by inserting a pin M3 through an upper die-half M1 (defining the outer shape of the cup-like body) and a lower die-half M2 (defining the inner shape of the cup-like body) at the position where the tooth is to be made. Once the injection molding is completed, the pin M3 is withdrawn, leaving a window 17 on the bottom wall 11 have a plan-view dimension equivalent to that of the corresponding tooth 21. Thanks to the fact that the teeth 21 preferably do not extend radially beyond the tubular appendage 41, these windows 17 are located at the bottom 43 of the annular seat 40. During use, this seat 40 is intended to be occupied by the deformed O-ring gasket. Consequently, the aforementioned windows 17 have no impact on the sealing of the cap 1.

The cap 1 according to the invention has been compared to the traditional rubber cap shown in FIGS. 1 to 4 in terms of both mechanical strength and pneumatic seal. In both cases the cap 1 showed a noticeable improvement in performance. In particular, the tests were conducted on caps according to the invention in which the corresponding cup-like bodies were made of polyamide reinforced with 30% glass fiber based on the total weight of the cup-like body.

In particular, tests were conducted to measure the minimum cap removal force. In greater detail, the test consists in pushing the guide of a floating caliper against the cap and measuring the minimum force that causes the cap to be removed from the caliper body.

For a traditional rubber cap as shown in FIGS. 1 to 4, the minimum removal force is 40 N, whereas for a cap 1 according to the invention, it was roughly about 240 N. The cap 1 according to the invention is much stronger than the traditional cap.

Figure 19:
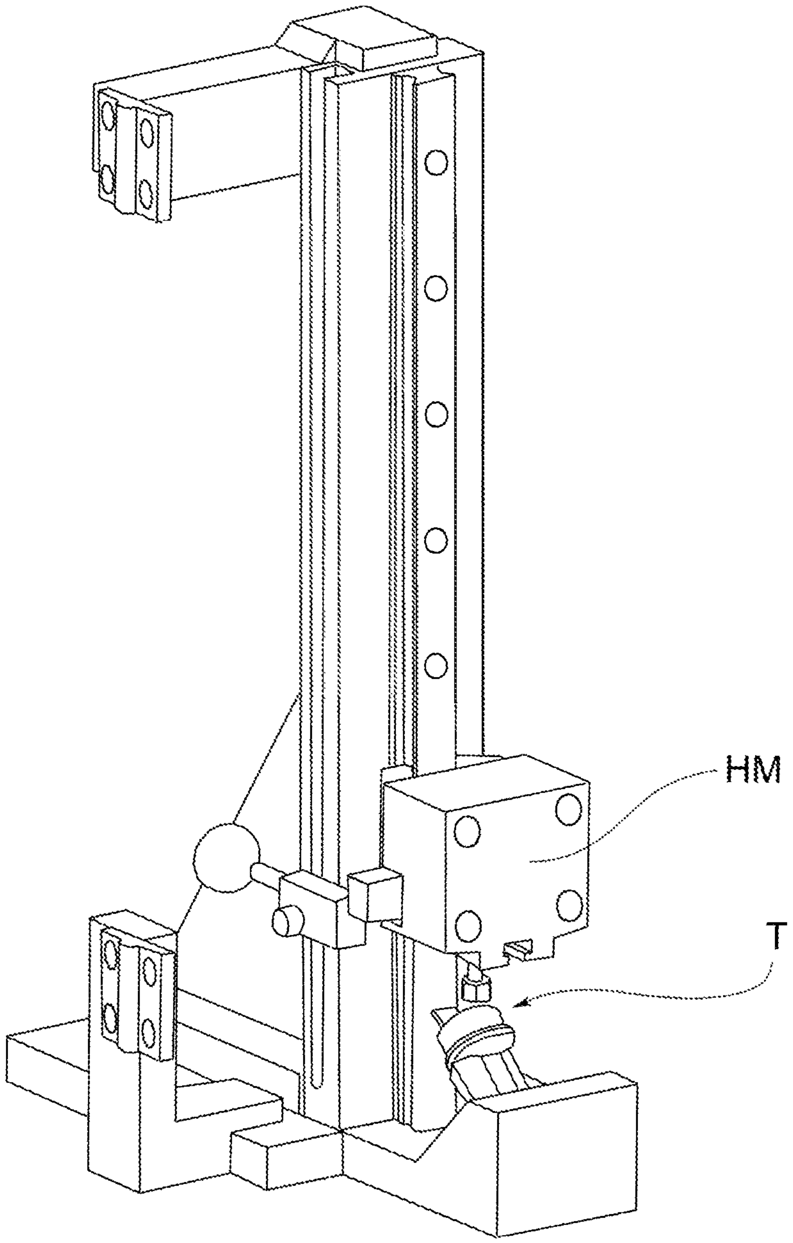
FIG. 19 shows an image of a device used to conduct impact tests on protective caps for floating caliper guides.
Figure 20:
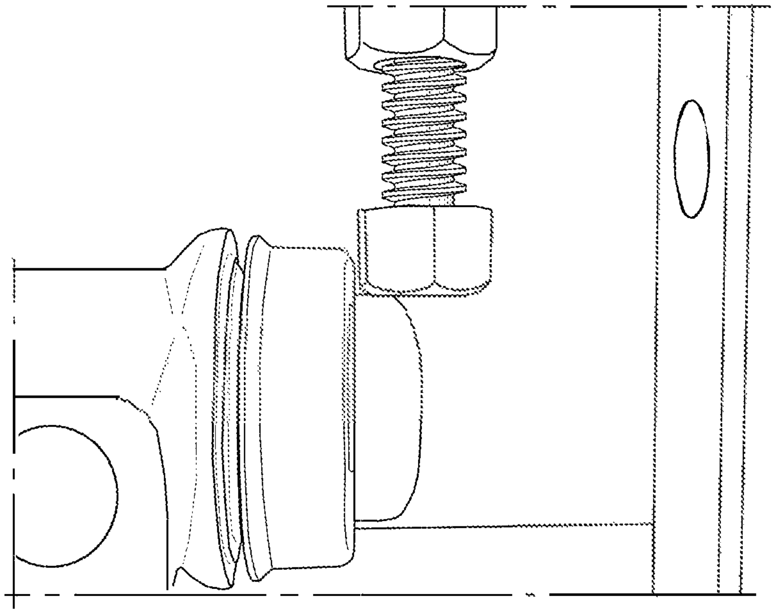
FIGS. 20 and 21 show two photographs of the impact area of the hammer used in the device of FIG. 19 on a cap according to the invention and on a traditional rubber cap shown in FIGS. 1-4, respectively.
Figure 21:
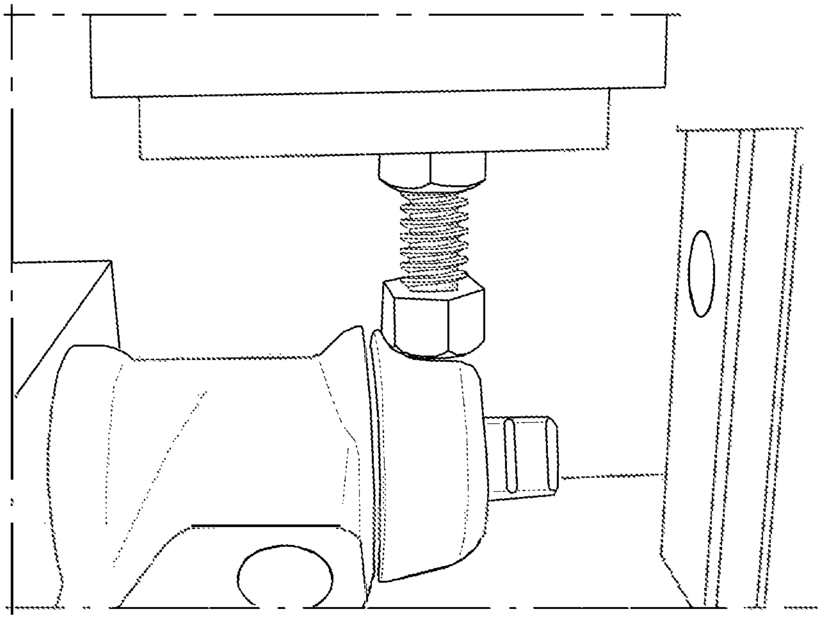

Tests were conducted to evaluate the impact strength of the cap 1 according to the invention and the traditional rubber cap in FIGS. 1-4. The test device is shown in FIG. 19; a striking mass HM (a hammer) of 2.6 kg was used. FIGS. 20 and 21 show two photographs of the impact area of the hammer used in the device of FIG. 19 on a cap according to the invention and on a traditional rubber cap shown in FIGS. 1-4, respectively.

The results of the tests on the traditional rubber cap are given in Table 1 in FIG. 22, while the results of the tests on the cap 1 according to the invention are given in Table 2 of FIG. 23.

These tests show that the cap 1 according to the invention has greater impact strength compared to a traditional rubber cap.

The brittle fracture behavior of the cap according to the invention is advantageous compared to the ductile fracture behavior of traditional rubber caps in terms of the ease of detecting possible damage to the cap. Indeed, perforations or cuts in the rubber cap could be difficult to detect, whereas a fracture of the cap according to the invention is clearer and easier to check.

The subject matter of the present invention also relates to a floating caliper for disc brakes, comprising:

at least one guide inserted into a sliding seat made in the floating caliper, a protective cap associated with a portion of said caliper that delimits said sliding seat, said cap 1 being arranged so as to close said sliding seat, The protective cap is a protective cap 1 according to the invention and in particular as described above.

The invention allows numerous advantages to be obtained which have been explained in the course of the description.

The protective cap for floating brake caliper guides according to the invention has greater impact strength.

The protective cap for floating brake caliper guides according to the invention is not subject to, or is at least less subject to, accidental removal compared to rubber caps.

The protective cap for floating brake caliper guides according to the invention provides better watertightness thanks to greater mechanical strength, less deformability, and, in the preferred embodiments, the presence of the gasket.

The protective cap for floating brake caliper guides according to the invention ensures irreversible fastening, while still being easy to install without the help of tools.

The invention thus conceived therefore achieves its intended purposes.

Of course, in its practical implementation it may also assume different forms and configurations from the one illustrated above, without thereby departing from the present scope of protection.

Furthermore, all details may be replaced with technically equivalent elements, and dimensions, shapes and materials used may be any according to the needs.

The invention claimed is:

1. A protective cap for guides of floating brake calipers, comprising a cup-like body intended to be associated with a floating brake caliper to close a sliding seat of a guide of such a floating caliper, characterized in that said cup-like body is made of plastic material reinforced with glass fibers, wherein said cup-like body comprises a bottom wall and a side wall which extends axially from said bottom wall and which peripherally delimits with its free edge a mouth of said cup-like body in a position axially opposite said bottom wall, said side wall having a circular cross section on a plane transversal to an axial direction, wherein the protective cap further comprises a gasket made of elastomeric material, housed in said cup-like body at the bottom wall, said gasket being intended to be compressed between said cup-like body and said floating caliper when in use so as to seal the sliding seat of the guide, wherein said gasket is in direct facing contact with the bottom wall, the side wall, and a tubular appendage.

2. The cap according to claim 1, wherein said plastic material is chosen from the group consisting of Polyamide, Polycarbonate, Polypropylene, Acrylonitrile Butadiene Styrene (ABS), High Density Polyethylene, Ethylene Vinyl Acetate, Polyethylene Terephthalate, Polyurethane, Polyoxymethylene and Polystyrene, said plastic material consisting of polyamide.

3. The cap according to claim 1, wherein the glass fiber content is between 25% and 35% by weight of said cup-like body.

4. The cap according to claim 1, further comprising means for snap-fastening said cup-like body onto the floating brake caliper.

5. The cap according to claim 4, wherein said snap-fastening means consist of a plurality of teeth which are made on an inner surface of said side wall of said cup-like body and project towards the inside of said cup-like body, each of said teeth being defined by a ledge which extends along an arc of circumference of said side wall.

6. The cap according to claim 5, wherein said teeth are all positioned at the same height in an axial direction with respect to said bottom wall, said teeth being distributed along the perimeter extension of said side wall so as to be spaced evenly apart, said teeth being three in number.

7. The cap according to claim 6, wherein each tooth is connected to said free edge of said side wall by means of a chamfer portion, having an inclined chamfer surface which faces towards the inside of the cup-like body and converges towards said bottom wall, said inclined chamfer surface forming an angle between 28° and 32° with respect to said axial direction.

8. The cap according to claim 1, wherein said gasket comprises an O-ring.

9. The cap according to claim 8, wherein said cup-like body comprises an annular seat to house said O-ring, said annular seat being made at said bottom wall and being coaxial with said side wall.

10. The cap according to claim 9, wherein said annular seat comprises a cavity radially delimited between said side wall and the tubular appendage, which extends from the bottom wall coaxially with said side wall, said bottom wall defining a bottom of said cavity.

11. The cap according to claim 10, wherein said tubular appendage extends axially in height from said bottom wall up to a height lower than that at which said teeth are positioned so that there is a predefined distance in the axial direction between the teeth and a free edge of said tubular appendage.

12. The cap according to claim 11, wherein said annular seat has an inside diameter greater than the inside diameter of said O-ring so that said O-ring is radially deformed when housed in said seat.

13. The cap according to claim 12, wherein said O-ring is sized in such a way that, once housed in said annular seat and radially deformed, said O-ring extends axially beyond the free edge of said tubular appendage until it substantially reaches said teeth so that when said cup-like body is associated with a caliper body during use, said O-ring may be axially compressed.

14. The cap according to claim 13, wherein said O-ring has a trapezoidal-shaped radial cross-section when not deformed, wherein a smaller base of said trapezoidal cross-section faces the inside of said O-ring and a larger base of said trapezoidal cross-section faces the outside of said O-ring.

15. The cap according to claim 14, wherein the bottom wall of said cup-like body comprises a shell which is coaxial with said side wall and defines a chamber which extends axially beyond the bottom of said annular seat, said shell having a transversal cross-section not exceeding the transversal cross-section of said tubular appendage.

16. The cap according to claim 1, wherein said cup-like body is made by injection molding.

17. A floating caliper for a disc brake, comprising:

at least one guide inserted into a sliding seat in the floating caliper, a protective cap associated with a portion of said caliper delimiting said sliding seat, said cap being placed so as to close said sliding seat, characterized in that said protective cap is a protective cap according to claim 1.

18. A protective cap for guides of floating brake calipers, comprising a cup-like body intended to be associated with a floating brake caliper to close a sliding seat of a guide of such a floating caliper, characterized in that said cup-like body is made of plastic material reinforced with glass fibers, wherein said cup like body comprises a tubular appendage which forms an inner diameter of said cup like body, a bottom wall which extends laterally from said tubular appendage, and a side wall which extends axially from said bottom wall forming an outer diameter of said cup like body, wherein said tubular appendage, said bottom wall, and said side wall form an annular seat, and wherein a gasket is located laterally between said inner diameter and said outer diameter, and wherein said bottom wall comprises at least one window.

19. The cap according to claim 18, wherein the at least one window comprises a plan view dimension equivalent to that of a corresponding tooth.

20. The cap according to claim 19, wherein the at least one window is axially aligned with the corresponding tooth.

* * * * *